(12) United States Patent
Kuboyama

(10) Patent No.: US 6,398,919 B1
(45) Date of Patent: Jun. 4, 2002

(54) EXTRACTION APPARATUS AND METHOD

(75) Inventor: Nobuyoshi Kuboyama, Carlisle, MA (US)

(73) Assignee: Aoki Corporation, Acton, MA (US)

( * ) Notice: Subject to any disclaimer, the term of this patent is extended or adjusted under 35 U.S.C. 154(b) by 0 days.

(21) Appl. No.: 09/664,237

(22) Filed: Sep. 18, 2000

Related U.S. Application Data

(62) Division of application No. 09/262,560, filed on Mar. 4, 1999.

(51) Int. Cl.[7] ................................................. B01D 3/34
(52) U.S. Cl. ........................... 203/49; 203/98; 203/100; 203/91; 62/3.2; 210/651; 210/767
(58) Field of Search ............................. 203/43, 10, 100, 203/91, 98, 49; 62/3.2; 435/816; 127/34; 210/651, 767

(56) References Cited

U.S. PATENT DOCUMENTS

| 4,055,196 A | * | 10/1977 | Kearney | ..................... 202/169 |
|---|---|---|---|---|
| 4,279,292 A | * | 7/1981 | Swiatosz | ..................... 165/61 |
| 4,337,121 A | * | 6/1982 | English | ..................... 202/169 |
| 4,506,510 A | | 3/1985 | Tircot | ............................. 62/3 |
| 4,586,342 A | | 5/1986 | Morishita et al. | ................ 62/3 |
| 4,776,104 A | | 10/1988 | Kuboyama | ..................... 34/77 |
| 5,147,538 A | * | 9/1992 | Wright et al. | ............ 210/198.2 |
| 5,170,697 A | | 12/1992 | Kuboyama | .................. 99/470 |
| 5,219,758 A | | 6/1993 | Kuboyama | ................. 435/302 |
| 5,572,923 A | | 11/1996 | Kuboyama | ................. 99/287 |
| 5,776,319 A | * | 7/1998 | Mar | ........................ 202/170 |

FOREIGN PATENT DOCUMENTS

GB        2293776        4/1996

* cited by examiner

*Primary Examiner*—Virginia Manoharan
(74) *Attorney, Agent, or Firm*—Nields & Lemack

(57) ABSTRACT

Method for extracting an ingredient from plant, animal or mineral by heating water to create a vapor, contacting the ingredient under a state of decompression with the vapor, condensing the vapor by passing the vapor over one or more surfaces cooled by a thermoelectric cooler, and collecting the condensate.

5 Claims, 6 Drawing Sheets

EXTRACTION APPARATUS AND METHOD

U.S. patent application Ser. No. 09/262,560, filed Mar. 4, 1999.

BACKGROUND OF THE INVENTION

The present invention relates to extraction and drying apparatus.

Apparatus disclosed in U.S. Pat. Nos. 5,572,923, 5,170, 697 and 4,776,104, the disclosures of which are herein incorporated by reference, include extraction systems for extracting an effective ingredient from a material such as malt, soybean or the like. Such apparatus comprises a pulverizing minute particle generating tank including means for heating a reservoir of water to a predetermined temperature and a means for pulverizing or atomizing water; an extracting device connected to the pulverizing minute particle generating tank, which extracting device holds a raw material layer for adhering an effective ingredient of raw material to the pulverized minute particles as the pulverizing minute particles pass through the raw material layer; a condensing device connected to the extracting device for liquefying the pulverized minute particles that have passed through and extracted an effective ingredient from the raw material layer; a reserve tank into which the water liquefied at the condensing device empties; a blower provided in a path between the reserve tank and the pulverizing minute particle generating tank for decompressing the raw material layer within the extracting device; and a cooling means for cooling the condensing device and the reserve tank.

It would be desirable to improve the extracting and drying efficiency of such apparatus, especially in view of environmental factors including the desire to reduce global warming. In addition, it would be desirable to simplify the operation of the apparatus, saving time and effort for the ultimate user.

SUMMARY OF THE INVENTION

The problems of the prior art have been overcome by the present invention, which provides a heating, extracting and condensing system and method for efficiently recovering an ingredient from a raw material. The condenser is a housing having one or more fins or the like that are cooled by one or more thermoelectric coolers.

DETAILED DESCRIPTION OF THE PREFERRED EMBODIMENTS

Figure 1:
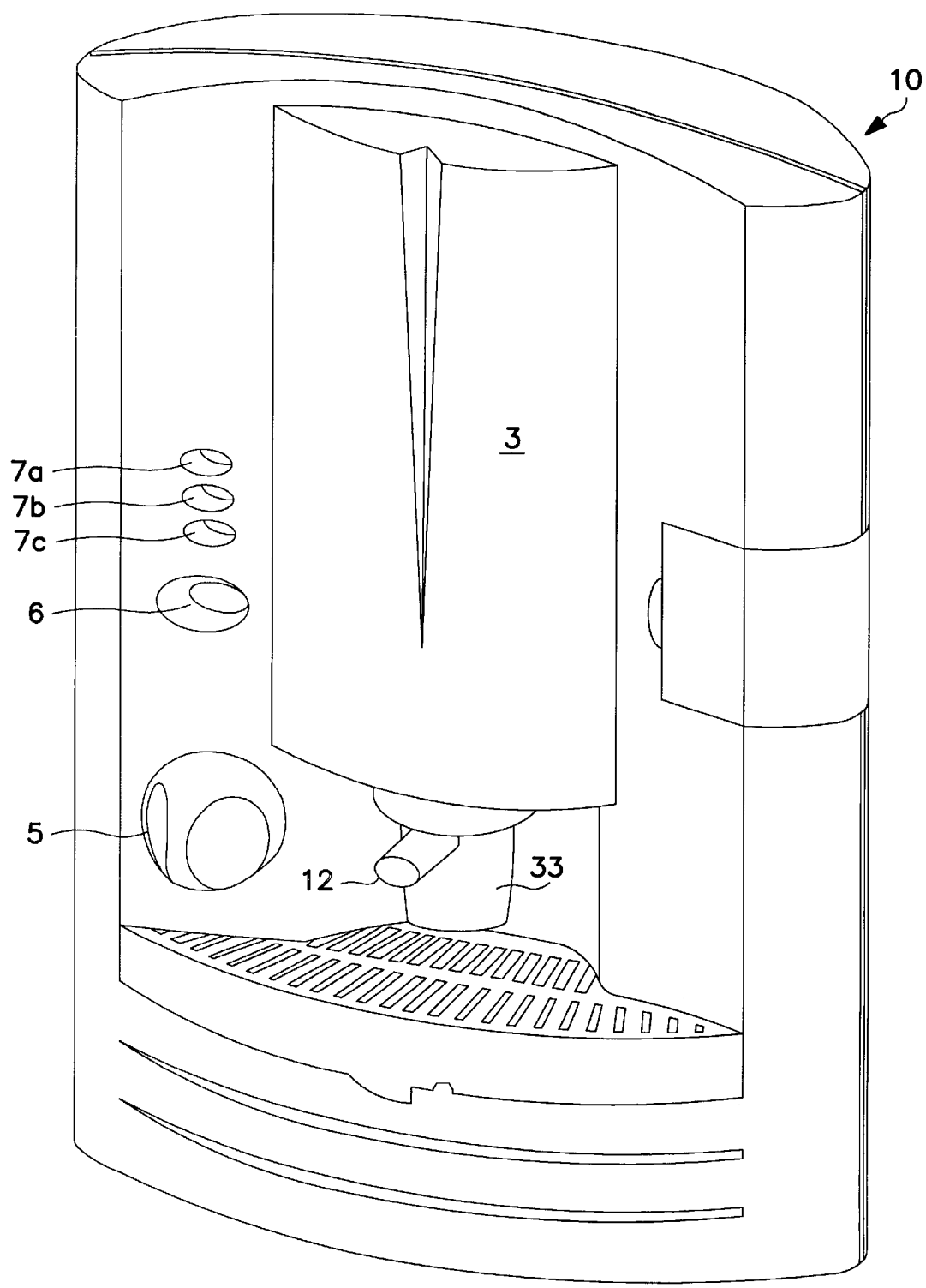
FIG. 1 is a perspective view of the extraction apparatus of the present invention.

Hereinafter, a preferred embodiment of the present invention will be described in more detail with reference to the accompanying drawings. FIG. 1 shows the outer housing for the extraction apparatus of the present invention. Condensate is dispensed into a cup or other container 33 having handle 12. Controls are provided to automatically regulate various process parameters. For example, timer 5 is provided to set a predetermined time for extraction. A start button 6 is also shown, as are various LED indicators 7a, 7b and 7c for indicating parameters such as container liquid level (e.g., a low level warning light), status of the heater, and status of the blower. The heater and blower can also be activated manually.

Figure 2:
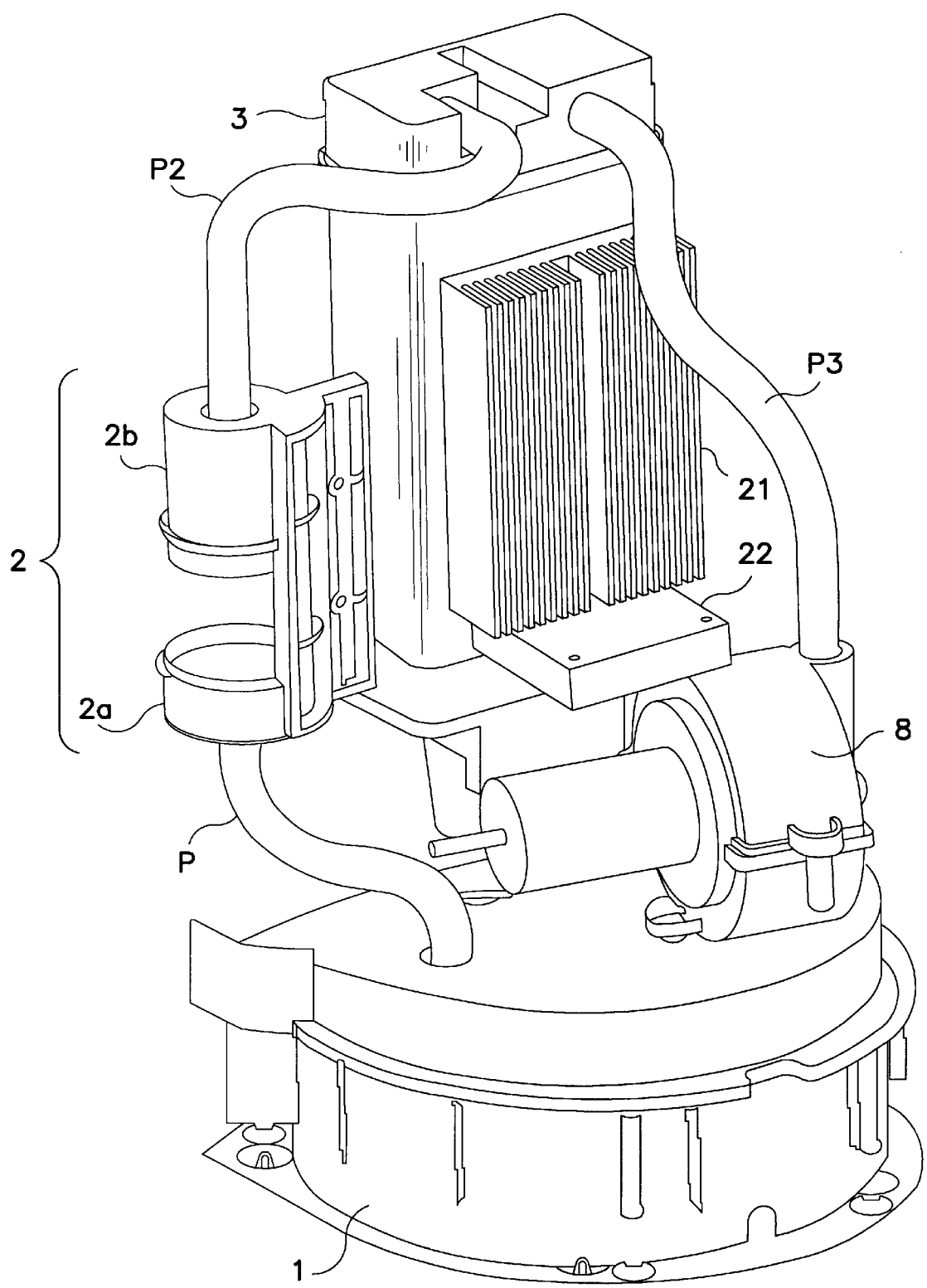
FIG. 2 is a rear perspective view of the internal design of the extraction apparatus of the present invention.
Figure 3:
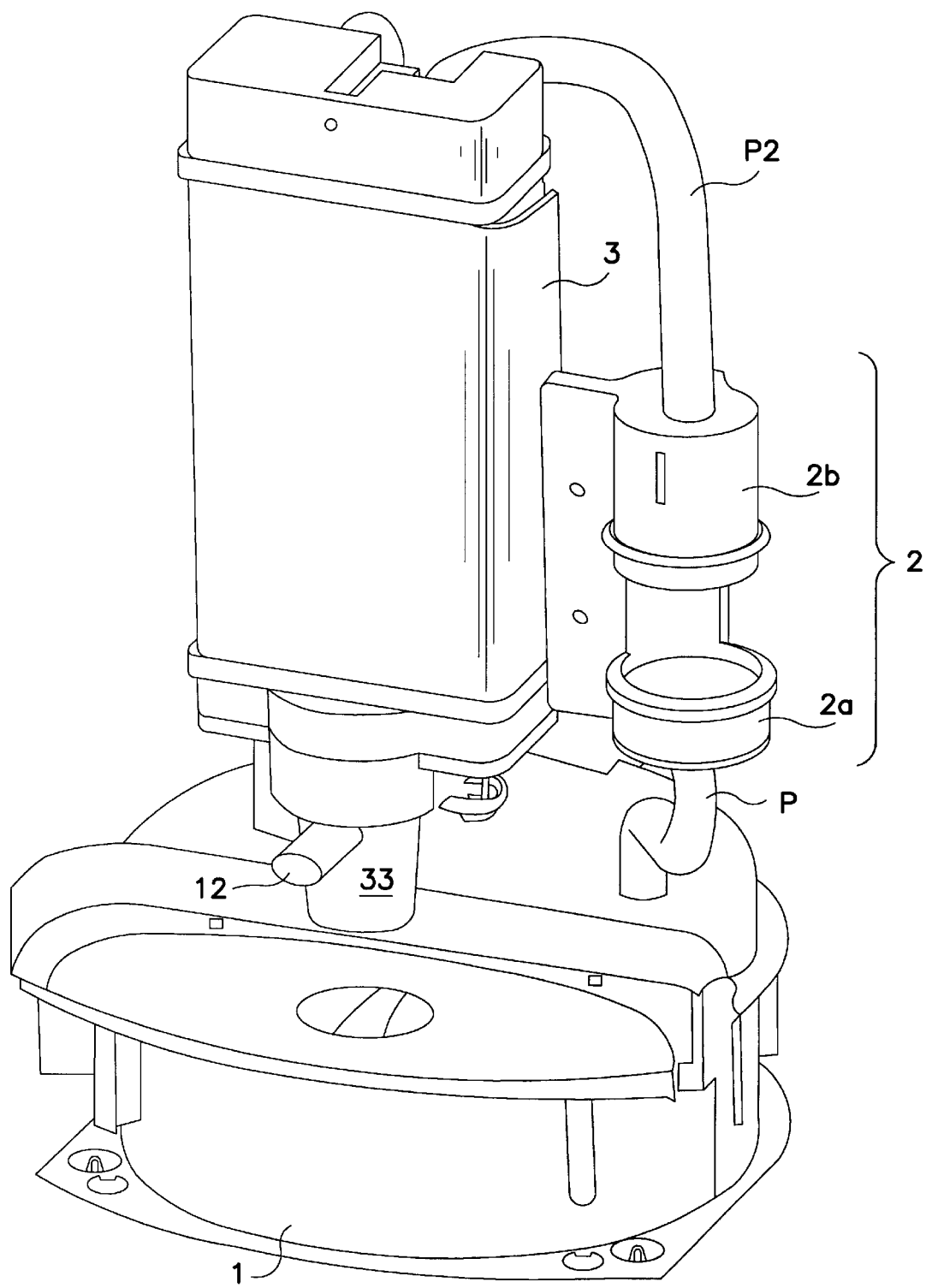
FIG. 3 is a front view of the internal design of the extraction apparatus of the present invention.

Turning now to FIGS. 2 and 3, reference numeral 1 is a housing or container having a reservoir of liquid, preferably water, therein. The container 1 is preferably made of stainless steel. The size of the container 1 is not particularly limited, and in the extraction embodiment shown, generally depends upon the amount of raw material used and the desired rate of extraction of effective ingredient therefrom. The container 1 includes means for heating the reservoir, which means is not particularly limited, and can include an electric heating element or coil, a UV or IR heating element, a burner, etc. The heating means must be sufficient to heat the liquid in the container 1 to a temperature necessary to cause vaporization of the liquid. The heater can be coupled to a gauge to allow the operator to specify the desired liquid temperature, and to a switch to activate the heater. The heating means can be located inside or outside of the container 1. In the embodiment shown, the heating means is an electric coil located underneath the container 1. Means (not shown) can be optionally provided in association with the container 1 to generate pulverized minute particles of water or a mist. Suitable means include an ultrasonic wave generating device comprising one or more sets (depending upon the tank size) of vibrators provided at the bottom of container 1, each vibrator having the ability to pulverize water and create a mist. Conventional ultrasonic wave generators that are used in domestic ultrasonic humidifiers are suitable. Centrifugal atomization also could be used.

Container 1 is in fluid communication via pipe P or the like with an extracting device 2 for extracting an effective ingredient from raw material contained therein. The extracting device 2 includes a first external cylinder 2a and a second external cylinder 2b, preferably constructed of stainless steel, surrounding a cup or the like which holds the raw material S. One or more of the cylinders 2a, 2b can be spring loaded in order to facilitate removal (and loading) of the cup. A temperature sensor (not shown) for detecting the temperature during the extraction operation can be fixed to the extracting device such as in the bottom side of the external cylinder 2a. Preferably the extraction device 2 holds the raw material in a crushed state so that maximum surface area is available for extraction. The extracting device 2 is in fluid communication with condensing device 3 via pipe P2.

Figure 4:
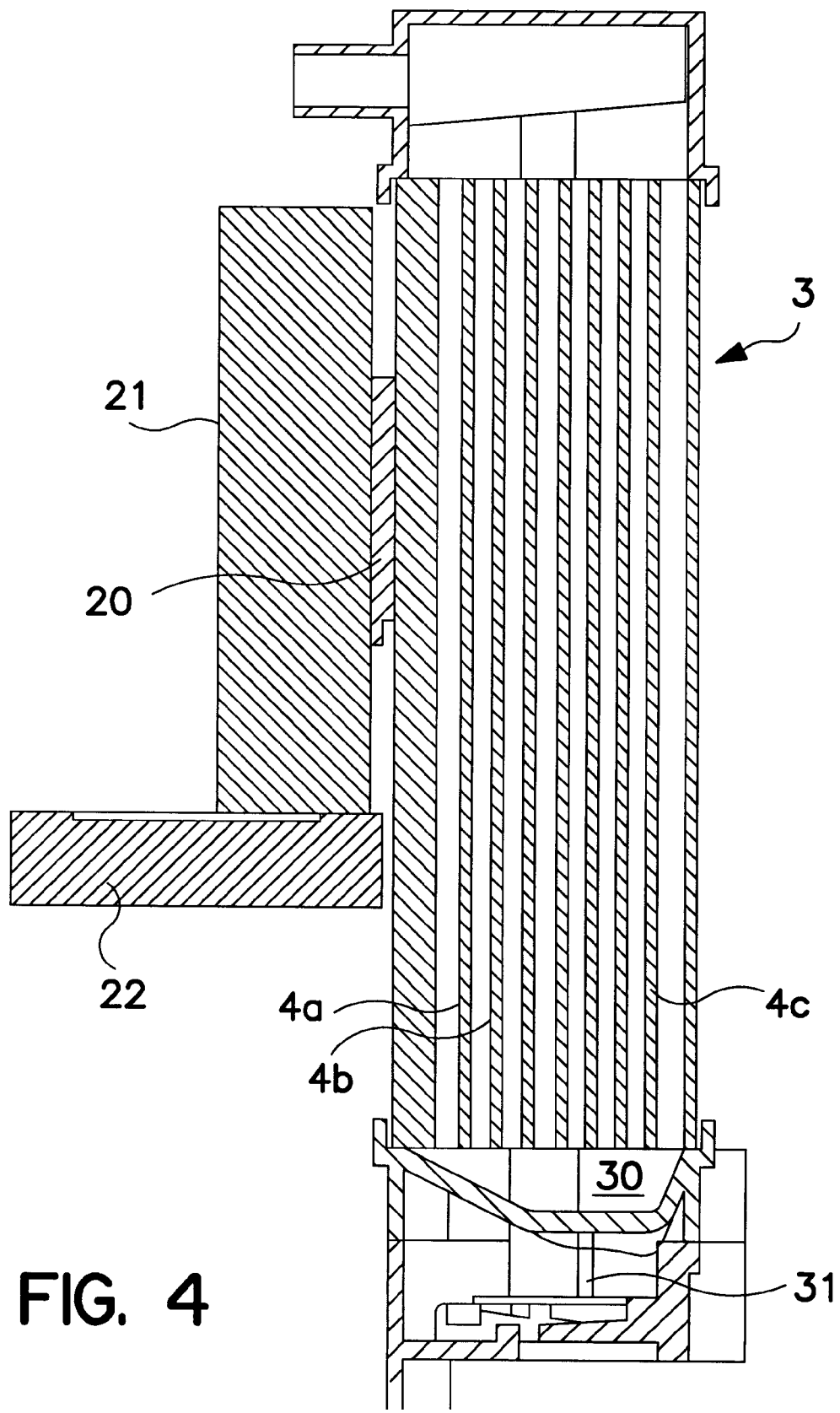
FIG. 4 is a cross-sectional view of the condensing portion of the extraction apparatus of the present invention.
Figure 5:
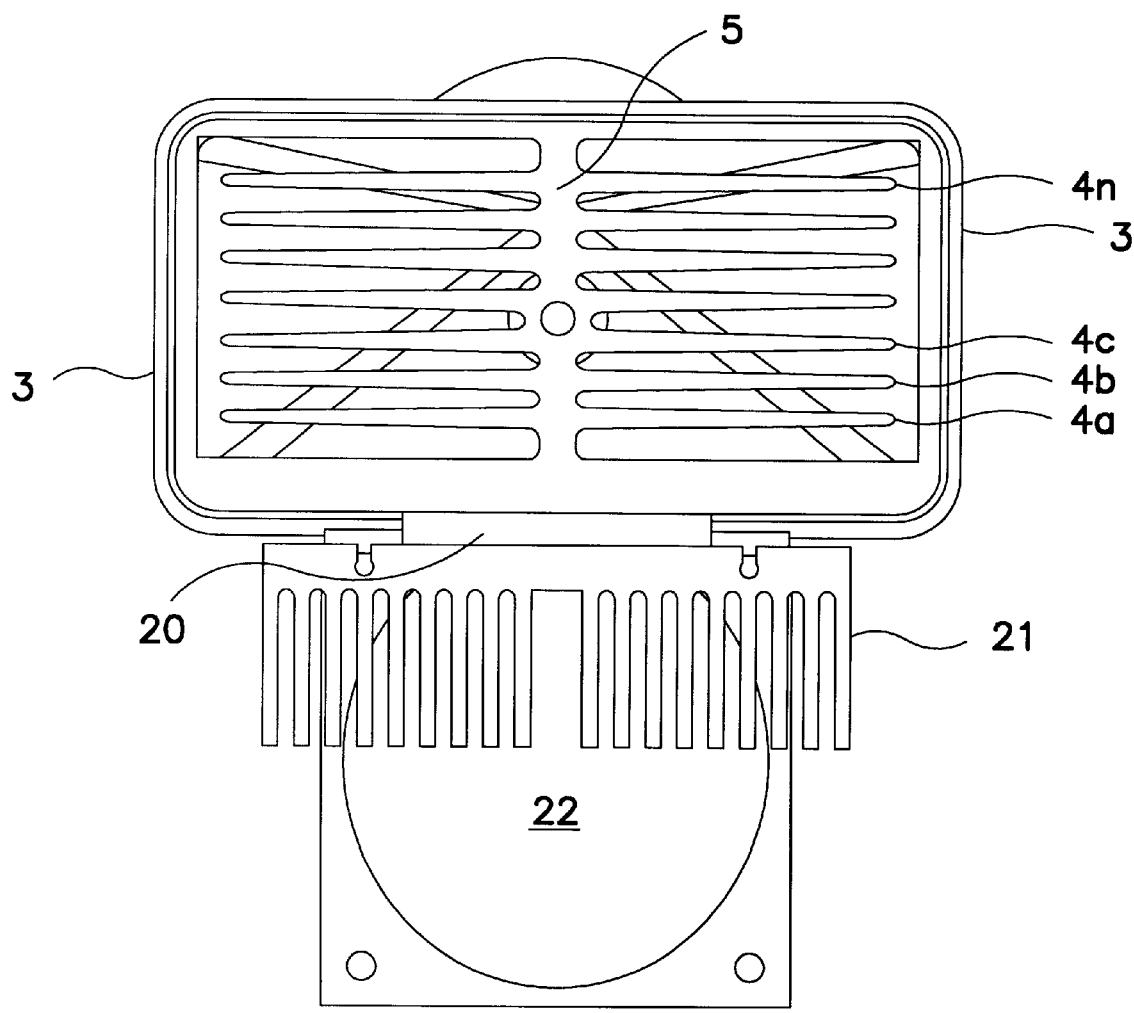
FIG. 5 is a top view of the condensing portion of the extraction apparatus of the present invention.

With reference to FIGS. 4 and 5, the condensing device 3 comprises a housing, which can be plastic, having one or more spaced cooling surfaces 4a–4n therein, preferably in the shape of fins as shown. The cooling surfaces 4a–4n can be made of any heat-conducting material, preferably metal, most preferably aluminum. The cooling surfaces 4a–4n preferably extend through the majority of the housing 3, providing extensive surface area within the housing for contact with the incoming material as described in detail below. The number of spaced cooling surfaces 4a–4n is not critical, it will depend upon the size of the condensing device 3 housing as well as the desired optimal rate of condensation. Preferably the cooling surfaces 4a–4n taper towards their free ends as shown. In the preferred embodiment, the cooling surfaces 4a–4n include a co-extensive divider 5 to divide the condensing device housing into two separate compartments or zones; one for flow of the incoming material, the other for recycle flow of outgoing material not condensed by the condensing device 3. More specifically, incoming material from pipe P2 flows downwardly (based on the orientation of the apparatus as shown in FIG. 2) into a first compartment where it contacts cooling surfaces 4a–4n positioned therein. Any material not condensed then crosses from this first compartment to the second compartment in the condensing chamber 30 where the two compartments communicate, and then flows upwardly (again with respect to the orientation of the apparatus as shown in FIG. 2) through the second compartment where it contacts the cooling surfaces 4a–4n positioned therein. Any material not condensed in the second compartment flows out pipe P3 and is recycled to container 1 via fan 8.

Cooling of the cooling surfaces 4a–4n is accomplished with one or more thermoelectric coolers 20 conventional in the industry. Briefly, the thermoelectric coolers are solid state heat pumps, whereby the flow of DC current through the cooler causes heat transfer, creating a cold side and a hot side. The thermoelectric cooler(s) 20 are placed in heat-conducting relationship with the cooling surfaces 4a–4n, such as by including the use of thermal conductive grease or the like. The coolers 20 are positioned such that the cold sides thereof cool the cooling surfaces 4a–4n. Depending upon the desired cooling, a modular design can be used containing multiple thermoelectric coolers 20. Preferably a heat sink 21 is also placed in heat-conducting relationship with the thermoelectric cooler(s) 20 so as to dissipate heat therefrom. A fan 22 can be used in proximity to the heat sink 21 to enhance the dissipation of heat as shown.

Surprisingly, the present inventor has found that the amount of condensate produced by the condensing device 3 including the thermoelectric cooler(s) 20 is efficiently ptimized if the temperature of the cooling surfaces 4a–4n is between 3° C. and 60°, more preferably 10–60° C., even more preferably 30–55° C., most preferably about 55° C. Temperatures at the lower end of the range require multiple thermoelectric coolers, and therefore a larger heat sink, more fan capacity and more electricity to power the cooler and fan.

Figure 6:
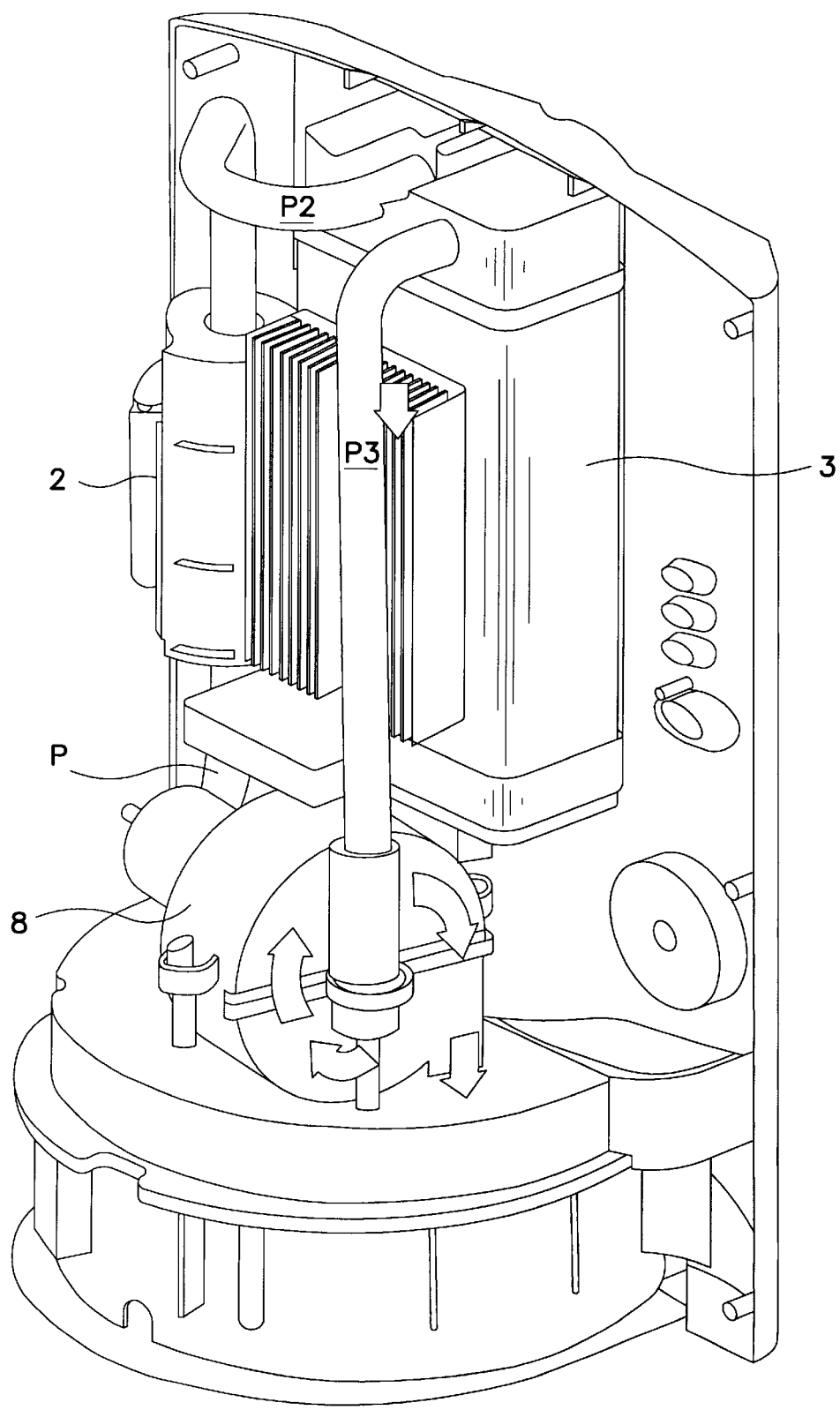
FIG. 6 is a rear perspective view of the internal design of the extraction apparatus of the present invention.

Condensate resulting from the cooling in the condensing device 3 flows into a condensing chamber 30 located at the lower end of condensing device 3 below the point at which the cooling surfaces 4a–4n terminate. From the condensing chamber 30, the condensate flows into a drain pipe 31 where it is directed into an extract reservoir such as a cup 33 (FIG. 1) where it is collected. Any vapor not condensed is recycled via pipe P3 and fan 8 to the container 1 for further processing (FIG. 6).

At least one or more air circulating or driving means is provided, preferably in the form of a fan or blower 8. The fan(s) 8 should be of a sufficient size so as to create decompression and provide flow through the system. The decompression should be within the range of about 5 to 500 mm H$_2$O. A conventional domestic vacuum cleaner fan has been found to be effective.

The operation of the apparatus will now be described based upon the above construction, and also a preferred embodiment of the manufacturing method will be described.

First, raw material, which can include herbs, vegetables, seaweed, corn, meat, fish, shellfish, soy beans, etc. is crushed to a magnitude approximating rice grains by any suitable means and is placed in the cup (not shown) of the extracting device 2 illustrated in FIG. 2. Once filled, a net can be placed over the raw material in order to stably maintain it in the cup.

The container 1 is filled with a sufficient amount of liquid so that a mist or vapor can be produced. Water is the preferred liquid, and will be used hereinafter for purposes of illustration. The water can be maintained at the same level continuously, or can be added batchwise. The heater is activated (such as by depressing start button 6) to heat the water to a suitable temperature such that the temperature in the extracting device 2 is at such a level (generally below 100° C.) as to not destroy the effective ingredients of the raw material. For example, in the case of soybeans, the temperature of the water is preferably heated to about 85° C., so that the temperature of the water when it reaches the extracting device is between about 60–70° C., preferably about 65° C. A temperature gauge can be used to set the appropriate temperature.

Once the water temperature in the container 1 reaches the desirable level, the timer 5 activates, which in turn activates the blower(s) 8 to initiate flow through the system. The blower(s) 8 causes air flow to circulate in the closed circulating path formed by the container 1, the extracting device 2 and the condensing device 3, as well as the pipes connecting these respective devices, as shown by the arrows in FIG. 6. The mist of water generated in the container 1 thus pass through pipe P together with the air flow and reaches the extracting device 2. The temperature in the extracting device 2 can be measured by a temperature sensor to ensure that the appropriate temperature is reached therein. The temperature in the container 1 can be controlled in response to the temperature in the extraction device 2.

As described above, the air flow is circulated between each device by the operation of the blower(s) 8, but since the extracting device 2 is filled with the crushed particles of raw material, the raw material creates a resistance to the air flow, thereby creating a decompressed space within the extracting device 2. Once the decompressed state is achieved, ingredients within the raw material are extracted to the surface of the crushed pieces of raw material, and are then captured by the mist of water passing therethrough. Since the temperature within the extracting device, and more particularly, the temperature within the cup holding the raw material is maintained within the desired range, the ingredients contained in the raw material are extracted into the water without being destroyed by heat.

The resulting water containing the effective ingredient of the raw material then flows to the condensing device 3 through the connecting pipe P2 together with the air flow from the blower 8. The thermoelectric cooling means is powered so that it cools the cooing surfaces 4a–4n to a temperature sufficient to cause condensation of the inflowing vapor. As the inflowing vapor passes over the cooling surfaces 4a–4n, condensation occurs. The liquefied or condensed material flows into condensing chamber 30, drains through drain 31, and can be ultimately collected into a suitable receptacle 33.

The particles which are not liquefied in the condensing device 3 are recycled back to the container 1 via pipe P3 and fan 8, as shown by the arrows in FIG. 6.

The raw material can be crushed to about the size of rice grain. However, the concentration of effective ingredient contained in the final product can be controlled by varying the size of the raw material. For example, if the raw material is crushed into fine pieces, a final product high in effective ingredient concentration can be obtained. However, in such a case the rate of final product produced decreases. As the size of the raw material increases, the concentration of effective ingredient in the final product decreases, and the rate of production increases.

The final product is a colorless, transparent and clear liquid containing a known material and an unknown active material which has not been analyzed or further extracted.

The health beverage refined from the raw material has a noticeable efficacy, and numerous examples of an activation of human cell are reported as a result of drinking after meals final product diluted by adding 5 cc to 180 cc of water. The resulting beverage has a vague smell and a faint flavor of the raw material, such as soy bean flavor, when it is drunk by adding the same to mineral water and the like.

In the above described embodiment, although soybean is mentioned as a raw material, the present invention is not to be so limited, as it is possible to manufacture entirely new beverages, cosmetics (e.g., lotions, creams), perfumes, etc. The present invention can obtain a health beverage which is particularly effective and novel for maintaining human health by extracting an ingredient from various materials which could not be extracted heretofore by the construction and operation as described above.

What is claimed is:

1. A method of extracting an ingredient from a member selected from the group consisting of plant, animal and mineral, comprising:
   a. heating water to a predetermined temperature to create a vapor;
   b. contacting said ingredient under a state of decompression wit said vapor to extract said ingredient from said member;
   c. condensing said vapor by passing said vapor over at least one surface cooled by at least one thermoelectric cooler to a temperature of 3–6° C.;
   d. collecting the resulting condensate; and
   e. recycling any vapor that is not condensed in step c to step a.

2. The method of claim 1, wherein said predetermined temperature is 85° C.

3. The method of claim 1 wherein the temperature of said vapor contacting said ingredient is 60–70° C.

4. The method of claim 1, wherein said at least one surface is cooled to a temperature of 30–55° C.

5. The method of claim 1, wherein said at least one surface is cooled to a temperature of about 55° C.

* * * * *

UNITED STATES PATENT AND TRADEMARK OFFICE
CERTIFICATE OF CORRECTION

PATENT NO.    : 6,398,919 B1                                                Page 1 of 1
DATED         : June 4, 2002
INVENTOR(S)   : Nobuyoshi Kuboyama It is certified that error appears in the above-identified patent and that said Letters Patent is hereby corrected as shown below:

<u>Column 6,</u>
Line 12, please correct the following: "3-6°C" should read -- 3-60°C --

Signed and Sealed this

Fifth Day of November, 2002

Attest:

Attesting Officer

JAMES E. ROGAN
*Director of the United States Patent and Trademark Office*

Disclaimer and Dedication 6,398,919 — Nobuyoshi Kuboyama, Carlisle, MA (US). EXTRACTION APPARATUS AND METHOD. Patent dated June 4, 2002. Disclaimer and Dedication filed October 8, 2002, by the assignee, Kazuko Kuboyama.

Hereby enters this disclaimer to all claims and dedicates to the public the entire term of said patent.

*(Official Gazette, August 26, 2003)*